(12) United States Patent
Vepakomma et al.

(10) Patent No.: US 11,481,635 B2
(45) Date of Patent: Oct. 25, 2022

(54) METHODS AND APPARATUS FOR REDUCING LEAKAGE IN DISTRIBUTED DEEP LEARNING

(71) Applicants: Massachusetts Institute of Technology, Cambridge, MA (US); Otkrist Gupta, Somerville, MA (US)

(72) Inventors: Praneeth Vepakomma, Weymouth, MA (US); Abhishek Singh, Cambridge, MA (US); Otkrist Gupta, Somerville, MA (US); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 314 days.

(21) Appl. No.: 16/862,494

(22) Filed: Apr. 29, 2020

(65) Prior Publication Data
US 2020/0349443 A1 Nov. 5, 2020

Related U.S. Application Data

(60) Provisional application No. 62/841,595, filed on May 1, 2019.

(51) Int. Cl.
*G06N 3/08* (2006.01)

(52) U.S. Cl.
CPC .................... *G06N 3/084* (2013.01)

(58) Field of Classification Search
CPC ....... G06N 3/084; G06N 3/0454; G06N 3/063
See application file for complete search history.

(56) References Cited

U.S. PATENT DOCUMENTS

| 2005/0283450 A1* | 12/2005 | Matsugu | G06V 40/19 706/20 |
| 2011/0060708 A1* | 3/2011 | Suzuki | G06N 20/00 706/12 |

(Continued)

OTHER PUBLICATIONS

Gupta, O., et al., Distributed learning of deep neural network over multiple agents; published in arXiv:1810.06060v1, Oct. 14, 2018.

(Continued)

*Primary Examiner* — Jamal Javaid
(74) *Attorney, Agent, or Firm* — Daly, Crowley, Mofford & Durkee LLP

(57) ABSTRACT

A distributed deep learning network may prevent an attacker from reconstructing raw data from activation outputs of an intermediate layer of the network. To achieve this, the loss function of the network may tend to reduce distance correlation between raw data and the activation outputs. For instance, the loss function may be the sum of two terms, where the first term is weighted distance correlation between raw data and activation outputs of a split layer of the network, and the second term is weighted categorical cross entropy of actual labels and label predictions. Distance correlation with the entire raw data may be minimized. Alternatively, distance correlation with only with certain features of the raw data may be minimized, in order to ensure attribute-level privacy. In some cases, a client computer calculates decorrelated representations of raw data before sharing information about the data with external computers.

17 Claims, 4 Drawing Sheets

(56) References Cited

U.S. PATENT DOCUMENTS

2012/0076296 A1* 3/2012 Graunke ................ H04L 9/065
          380/252
2017/0372201 A1  12/2017 Gupta et al.
2018/0107927 A1*  4/2018 Frey ....................... G16B 40/00

OTHER PUBLICATIONS

Konecny, J., et al., Federated Learning: Strategies for Improving Communication Efficiency; published in arXiv:1610.05492v2, Oct. 30, 2017.
Szekely, G., et al., Measuring and testing dependence by correlation of distances; published in The Annals of Statistics, vol. 35, No. 6; pp. 2769-2794, year 2007.
Vepakomma, P., et al., Supervised Dimensionality Reduction via Distance Correlation Maximization; published in arXiv:1601.00236v1, Jan. 3, 2016.
Vepakomma, P., et al., Split learning for health: Distributed deep learning without sharing raw patient data; published in arXiv:1812.00564v1, Dec. 3, 2018.
Vepakomma, P., et al., No Peek: a survey of private distributed deep learning; published in arXiv: 1812.03288v1, Dec. 8, 2018.
Verbraeken, J., et al., A Survey on Distributed Machine Learning; published in ACM Computing Surveys, vol. 53, No. 2, Article 30, Mar. 2020.
Yang, Z., et al., Adversarial Neural Network Inversion via Auxiliary Knowledge Alignment; published in arXiv:1902.08552v1, Feb. 22, 2019.

* cited by examiner

```
┌─────────────────────────────────────────────────────────────┐
│ TRAIN A NO-PEEK DNN TO MINIMIZE A LOSS FUNCTION, WHERE (A) THE LOSS │
│ FUNCTION IS THE SUM OF A WEIGHTED DISTANCE CORRELATION TERM AND A   │─ 201
│ WEIGHTED CATEGORICAL CROSS ENTROPY TERM; AND (B) THE DISTANCE       │
│ CORRELATION IS CALCULATED WITH RESPECT TO ALL OF THE RAW DATA.      │
└─────────────────────────────────────────────────────────────┘
                              │
                              ▼
┌─────────────────────────────────────────────────────────────┐
│           EMPLOY THE TRAINED DNN TO MAKE PREDICTIONS.       │─ 202
└─────────────────────────────────────────────────────────────┘
```

FIG. 2

METHODS AND APPARATUS FOR REDUCING LEAKAGE IN DISTRIBUTED DEEP LEARNING

RELATED APPLICATIONS

This application claims the benefit of U.S. Provisional Application No. 62/841,595 filed May 1, 2019 (the "Provisional").

FIELD OF TECHNOLOGY

The present invention relates generally to reducing leakage of information in distributed deep learning.

COMPUTER PROGRAM LISTING

The following twelve computer program files are incorporated by reference herein: (1) AEs.txt with a size of about 7 KB; (2) Analyze.txt with a size of about 142 KB; (3) dCorr.txt with a size of about 1 KB; (4) generate_ir.txt with a size of about 4 KB; (5) image_folder.txt with a size of about 3 KB; (6) load_model.txt with a size of about 4.335 KB; (7) main.txt with a size of about 8 KB; (8) noPeekCifar10.txt with a size of about 217 KB; (9) noPeekUTKFace.txt with a size of about 516 KB; (10) noPeekUTKFace_attribute.txt with a size of about 459 KB; (11) resnet.txt with a size of about 5 KB; and (12) ResNet50.txt with a size of about 1 KB. The program file dCorr.txt was created as an ASCII .txt file on Apr. 20, 2020. The other eleven program files listed above were each created as an ASCII .txt file on Apr. 3, 2020.

BACKGROUND

In a machine learning method known as split learning, a deep neural network (DNN) may be trained on raw data from one or more clients, without sharing the raw data with the server computer that is helping to perform the training. For instance, in split learning, each of the clients may store, or have access to, a confidential subset of raw data. Due to regulatory, legal, or privacy constraints, the entities associated with the respective clients may need or want to preserve the confidentiality of their respective subsets of raw data. This may, as a practical matter, prevent these entities from sharing their raw data.

In split learning, a DNN may be trained without sharing raw data, as follows: Loosely speaking, the DNN may be split. That is, the DNN may comprise two portions: (a) layers of the DNN that are performed on a client computer ("client layers"); and (b) layers that are performed on a server computer ("server layers"). The client may take, as input, confidential raw data. The client may: (a) perform forward propagation through the client layers up to and including a layer we sometimes call the "split layer"; (b) encrypt the outputs of the activation functions (activation outputs) of the split layer, such as by RSA encryption; and (c) send the encrypted activation outputs to the server. Then, the server may: (a) decrypt the activation outputs and feed these as input into a first layer of the server layers; (b) perform forward propagation through the server layers; (c) perform backpropagation through the server layers; (c) encrypt gradients for the first layer of the server layers (e.g., by RSA encryption); and (d) send the encrypted gradients to the client. Then the client may: (a) decrypt the gradients and feed them into the split layer; and (b) perform backpropagation through the client layers.

In split learning, raw data from multiple clients may be employed to train the DNN. The raw data for each client may be different. The forward propagation (through client layers and then server layers) and backpropagation (through server layers and then client layers) may be repeated multiple times for each client during training of the DNN.

In some cases, split learning is performed in what we call "peer-to-peer" mode. That is, after the DNN trains on raw data from a first client: (a) the server may send, to a second client, information regarding where to access encrypted weights and biases (for client layers) that have been outputted by the first client; (b) the second client may download and decrypt these weights and biases and use them as initial values for client layers; and (c) forward propagation (through client layers and then server layers) and backpropagation (through server layers and then client layers) may be repeated multiple times for the second client. This process may be repeated until each of the clients has helped to train the DNN.

In some other cases, split learning is performed in what we call "centralized" mode. That is, after the DNN trains on raw data from a first client: (a) the first client may encrypt weights and biases (for client layers) and upload them to a weight server; (b) the second client may download and decrypt these weights and biases and use them as initial values for client layers; and (c) forward propagation (through client layers and then server layers) and backpropagation (through server layers and then client layers) may be repeated multiple times for the second client. Again, this process may be repeated until each of the clients has helped to train the DNN. In centralized mode, the weight server may be operated by a third party, or by an entity associated with the server, or by an entity associated with one or more of the clients.

Alternatively: (a) the first client may randomly initialize weight and biases and send them to the other clients as a seed; and (b) later, clients may share updated weights and biases that are expressed as changes from the seed, rather than sharing the actual new weights and balances.

Nonlimiting examples of split learning are described in U.S. Patent Publication 2017/0372201 A1, published Dec. 28, 2017, for Secure Training of Multi-Party Deep Neural Network, by Okrist Gupta et al., application Ser. No. 15/630,944, (the "Gupta Patent Publication"). The entire disclosure of the Gupta Patent Publication is incorporated by reference herein.

Problem: In conventional split learning, there is a risk that an attacker may still be able to reconstruct the raw data. For instance, the attacker may perform a reconstruction attack by reconstructing raw data from transformed activation outputs. Or, for instance, the attacker may be an insider threat that resides inside the client or server and gain access to activation outputs at any layer of the DNN. Or for instance, the attacker may be perform a prediction API attack by reconstructing from final layer logits. In each of these examples, an attacker may be able to reconstruct raw data if the attacker gains access to: (a) a portion of the raw data (leaked raw data); (b) corresponding activation outputs at an intermediate layer of the DNN; and (c) the remainder of the activation outputs for the same layer. This is because, in conventional split learning, the attacker: (a) may employ the leaked raw data and the leaked corresponding output activations at a given layer of the DNN to learn a map from leaked activation outputs to the leaked raw data; and (b) may then employ the map to infer the unleaked raw data.

We sometimes call reconstruction of unleaked raw data (based on activation outputs of an intermediate layer of a DNN) "leakage of information".

SUMMARY

In illustrative implementations of this invention, leakage of information in distributed deep learning is greatly reduced or eliminated.

In some implementations, leakage of information is reduced because the loss function of the DNN is selected in such a way as to reduce distance correlation between: (a) raw data; and (b) activation outputs at any given layer of the DNN. Distance correlation is a measure of linear and non-linear statistical dependency. In some cases, reducing distance correlation between raw data and the activation outputs makes it impossible for an attacker to accurately reconstruct the raw data. In other words, reducing this distance correlation may cause any reconstruction of raw data from the activation outputs to be highly inaccurate. The decorrelated data may enable the DNN to accurately perform a prediction task but prevent reconstruction of the raw data itself.

In order to reduce distance correlation, a distance correlation term may be added to the loss function of a DNN that performs split learning. This distance correlation term may be a measure of distance correlation between input data and activation outputs of the split layer of the DNN. We sometimes call such a DNN (which has a distance correlation term added to its loss function and which performs split learning) a "no-peek" DNN.

In some cases, the loss function of a no-peek DNN is a sum of a weighted distance correlation and a weighted categorical cross-entropy. The no-peek DNN may be trained to minimize this loss function. Put differently, the no-peek DNN may be trained to jointly minimize distance correlation (to reduce leakage of information) and categorical cross entropy (to ensure that the DNN makes accurate predictions).

In some cases: (a) it is important to protect the confidentiality of all of the raw data; and (b) thus the loss function minimizes distance correlation between the activation outputs and the entire raw dataset.

Reducing distance correlation between raw data and activation outputs may have at least some detrimental effect on the DNN's ability to make accurate predictions. Thus, in some cases, it is desirable to minimize distance correlation only for those aspects of the raw data that need to be private.

In some cases, there is a need to ensure privacy of only specific attributes of the raw dataset (such as age, biological sex or race). In these cases, the loss function of a no-peek DNN may be selected in such a way as to tend to minimize distance correlation between the activation outputs and only these specific attributes of the raw dataset. This may make it difficult for an attacker to reconstruct those specific features. For instance, in some use scenarios: (a) the raw data consists of images of faces; (b) it is desirable to prevent an attacker from reconstructing an image of a person's face in a way that reveals the features of age, biological sex, or race; and (b) the loss function of the DNN tends to minimize the distance correlation for only these features.

In some implementations of this invention, a client calculates decorrelated representations of raw data before sharing information about this data with external computers. We sometimes call this approach "universal decorrelation".

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIGS. 2 and 3 illustrate methods in which a loss function is minimized, where the loss function is the sum of a weighted distance correlation and a weighted categorical cross entropy. In FIG. 2, the distance correlation is calculated with respect to all of the raw data. In FIG. 3, the distance correlation is calculated with respect to only certain features of raw data.

Figure 1:
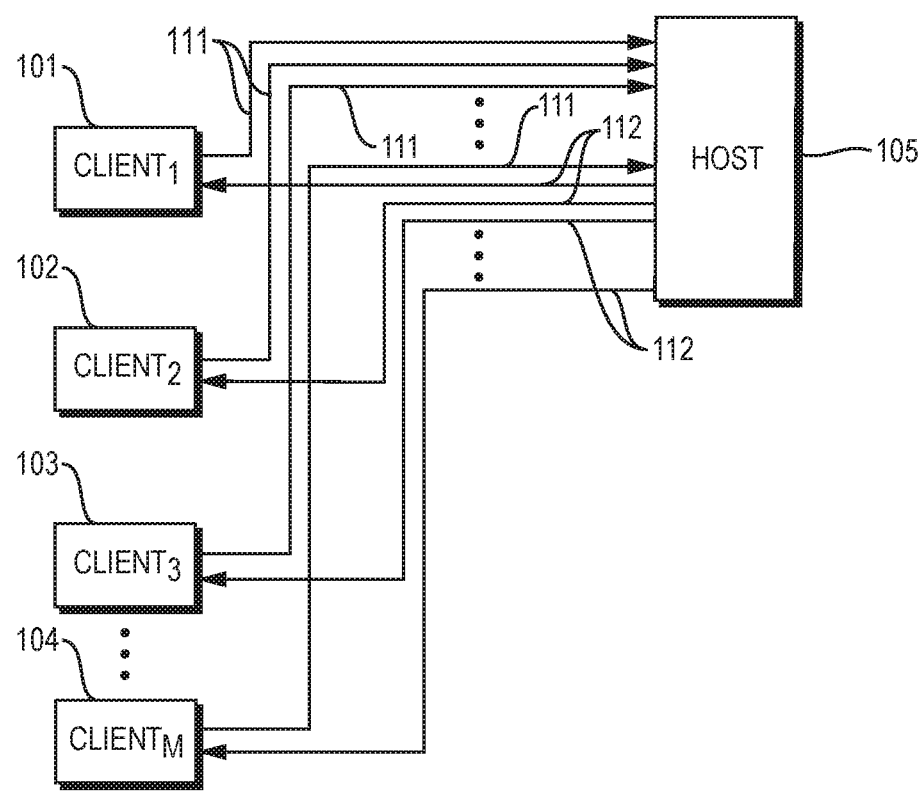
FIG. 1 shows hardware employed for a no-peek DNN.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

No Peek DNN

In illustrative implementations, a distance correlation term is added to the loss function of a DNN that performs split learning. We sometimes call such a DNN (which has a distance correlation term added to its loss function and which performs split learning) a "no-peek" DNN.

A no-peek DNN may be trained in such a way as to reduce distance correlation between: (a) raw data and (b) activation outputs of the DNN. Reducing this distance correlation may reduce leakage of information. For instance, reducing this distance correlation may prevent an attacker from accurately reconstructing unleaked raw data, even if the attacker accesses both activation outputs of an intermediate layer of no-peek DNN and a leaked small portion of the raw data.

To reduce this distance correlation (and thus leakage of information), a no-peek DNN may be trained to minimize a loss function, where the loss function of the DNN is a sum of a weighted distance correlation and a weighted categorical cross-entropy. Put differently, a no-peek DNN may be trained to jointly minimize distance correlation and categorical cross entropy.

For instance, a no-peek DNN may be trained to minimize the following loss function:

$$\alpha_1 DCOR(X,Z) + \alpha_2 CCE(Y_{true}, Y) \qquad \text{(Equation 1)}$$

where DCOR is distance correlation, CCE is categorical cross entropy, X is input data, Z is estimated activation outputs of an intermediate layer of the DNN, $Y_{true}$ is true labels for the input data, Y is predicted labels for the input data, $\alpha_1$ and $\alpha_2$ are scalar weights, and n is the number of samples of input data.

In Equation 1, the intermediate layer may, in some cases, be the split layer of the DNN. The split layer may be the last layer of the DNN that is performed by a client during forward propagation. In each of Equations 1 to 10 herein, the bolded terms may be matrices or vectors.

In some cases, a computer employs the Pytorch autograd software package in order to minimize the loss function set forth in Equation 1.

In Equation 1, DCOR(X, Z) may be distance correlation between input data X and activation outputs Z of a split layer. Advantageously, distance correlation is differentiable and may be estimated in closed-form. In some cases, a computer performs a fast estimator of distance correlation. The fast estimator may have O(nlogn) computational complexity for univariate and O(nKlogn) complexity for multivariate settings with O(maxn,K) memory requirement, where K is the number of random projections.

As noted above, reducing distance correlation (between raw data and activation outputs of the split layer) tends to prevent an attacker from being able to accurately reconstruct unleaked raw data. For instance, reducing this distance correlation may decrease the accuracy of an attacker's reconstruction, as measured by a quantitative measure of similarity or distance (e.g., mean squared error, absolute error, total variation distance, or Earth mover's distance) or by a quantitative measure of perceptual similarity or distance (e.g., a perceptual hash function).

In Equation 1, the categorical cross entropy term tends to reduce error in prediction. In Equation 1, CCE($Y_{true}$, Y) is categorical cross entropy between (a) true labels for the input data and (b) predicted labels for the input data. The categorical cross entropy may be calculated by computing the cross entropy of the output of a softmax function.

In some cases, scalar weights of the respective weighted terms in the loss function are tuned in order to achieve both accurate predictions and reduced leakage. For instance, initial scalar weights may be heuristically selected, then tested, and if a satisfactory balance of accuracy and reduced leakage is not achieved, a new set of scalar weights may be tested. This process may be iterated until the desired goal (of both accurate predictions and reduced leakage) is achieved. For instance, in Equation 1, scalar weights $\alpha_1$ and $\alpha_2$ may be tuned as described above in this paragraph, in order to optimize a trade-off between privacy and utility.

FIG. 1 shows hardware employed for a no-peek DNN. In FIG. 1, a set of client server (e.g., 101, 102, 103, 104) and a host computer (105) perform split learning. However, in FIG. 1: (a) the loss function of the DNN includes a distance correlation term; and (b) minimizing the loss function tends to minimize distance correlation between raw data and split layer activation outputs, and thus to reduce leakage of information. The clients may send encrypted activation outputs 111 to the host during forward propagation. Likewise, the host may send encrypted gradients 112 to the clients. The training of the DNN may be performed one client at a time. For instance, the training may be performed in peer-to-peer mode or in centralized mode, as described in the Background section above.

FIG. 2 illustrates a method in which distance correlation is calculated with respect to the entire raw dataset. In the method shown in FIG. 2, the method comprises at least the following steps: Train a no-peek DNN to minimize a loss function, where (a) the loss function is the sum of a weighted distance correlation and a weighted categorical cross entropy; and (b) the distance correlation is calculated with respect to all of the raw data (Step 201). Employ the trained DNN to make predictions (Step 202).

Attribute-Level Privacy

Reducing distance correlation between raw data and activation outputs may have at least some detrimental effect on the DNN's ability to make accurate predictions. Thus, in some cases, it is desirable to minimize distance correlation for only those aspects of the raw data that need to be private.

In some cases, there is a need to ensure privacy of only specific features of the raw dataset (such as age, biological sex or race). In these cases, the loss function of a no-peek DNN may be selected in such a way as to tend to minimize distance correlation between the activation outputs and these specific features of the raw data. This may make it difficult for an attacker to reconstruct those specific features.

For instance, to achieve this attribute-level privacy, a no-peek DNN may minimize a modified version of the loss function of Equation 1. This modified version may be identical to Equation 1 above except that, in the modified version, X is a set of one or more specific attributes of the raw data for which privacy is desired. Put differently, when training the DNN to ensure privacy of only one or more features of the raw data, the DNN may calculate distance correlation between the activation outputs and only those feature(s) of the raw data (instead of distance correlation between activation outputs and all of the raw data.

When training the DNN to ensure privacy of only certain attributes, the DNN may still train on the entire raw dataset.

In some implementations of this invention, the distribution of the activation outputs of a given layer of the DNN may be modeled as a multivariate Gaussian distribution. Alternatively, in some cases, the distribution of the raw data or the activation outputs of a given layer of the DNN may be other than Gaussian.

Figure 3:
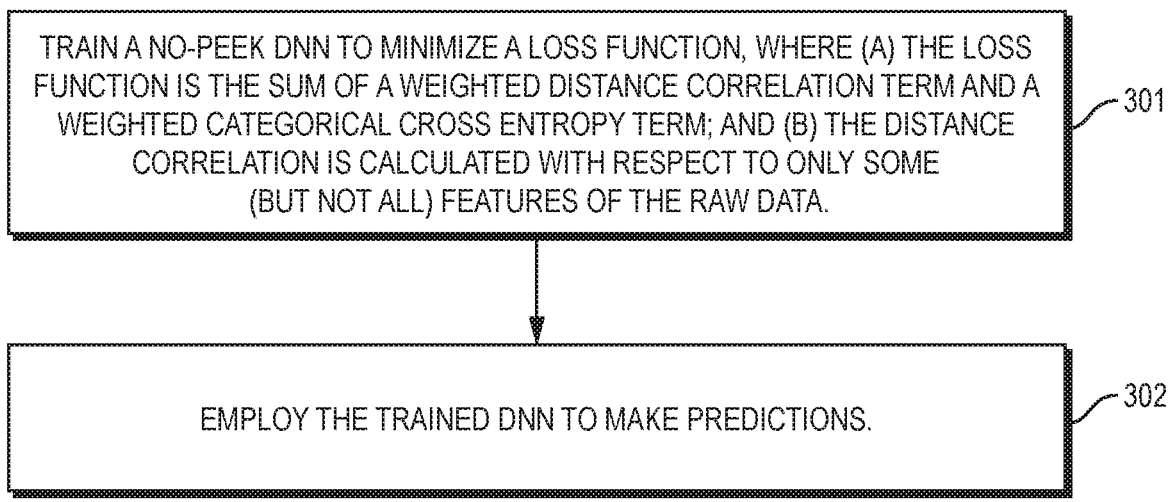

FIG. 3 illustrates a method in which distance correlation is calculated with respect to only certain features of raw data. In the method shown in FIG. 3, the method comprises at least the following steps: Train a no-peek DNN to minimize a loss function, where (a) the loss function is the sum of a weighted distance correlation and a weighted categorical cross entropy; and (b) the distance correlation is calculated with respect to only some (but not all) features of the raw data (Step 301). Employ the trained DNN to make predictions (Step 302).

Universal Decorrelator

In some implementations of this invention, a client calculates decorrelated representations of raw data before sharing information about this data with external computers. Loosely speaking, the client may sanitize the data before sharing it. We sometimes call this approach "universal decorrelation".

In some implementations, the universal decorrelation method involves minimizing distance correlation with raw data while preserving distance correlation with labels. For instance, the decorrelator program may maximize the following objective function:

$$f(Z) = \frac{Tr(Z^T L_y Z)}{\sqrt{Tr(y^T L_y y) Tr(Z^T L_z Z)}} - \frac{Tr(Z^T L_x Z)}{\sqrt{Tr(X^T L_x X) Tr(Z^T L_z Z)}} \quad \text{(Equation 2)}$$

where (1) Tr means trace (in the linear algebra sense of the term); (2) $L_x$ and $L_y$ are Laplacian matrices formed over adjacency matrices $\hat{E}_x$ and $\hat{E}_y$, respectively; (3) $E_x$ and $E_y$ are matrices of squared Euclidian distances; (4) X is a matrix of raw data; (5) y is a matrix of labels for the raw data; and (6) Z is a matrix of activation outputs of a layer of a neural network.

For instance, in Equation 2, Z may be a matrix of activation outputs of a split layer of a DNN (or of a layer that corresponds thereto).

An iterative update may be performed to maximize the objective function set forth in Equation 2 above. This iterative update may be a variant of majorization-minimization and may be given by $Z_t = HZ_{t-1}$ where $$H = (\gamma^2 D_X - \alpha S_{X,y})^\dagger (\gamma^2 D_X - L_M) \quad \text{(Equation 3)}$$

for a fixed $\gamma^2$, some $\alpha$ and where $$k_X = \frac{1}{\sqrt{Tr(X^T L_x X)}}, k_Y = \frac{1}{\sqrt{Tr(y^T L_y y)}}$$

are constants, and $S_{X,y} = k_y L_y - \beta k_x L_x$ for a tuning parameter $\beta$. Alternatively, the tuning parameter $\beta$ is omitted (or equivalently is equal to 1) in the definition of $S_{X,y}$.

In the preceding sentence (which starts with "This iterative update . . . " and includes Equation 3): (1) Tr means trace (in the linear algebra sense of the term), (2) $L_x$ and $L_y$ are Laplacian matrices formed over adjacency matrices $\hat{E}_x$ and $\hat{E}_y$, (3) $E_x$ and $E_y$ are matrices of squared Euclidian distances, (4) X is a matrix of input data; (5) y is a matrix of labels for the raw data; and (6) $D_X$ is diag($L_x$).

In Equation 2, the term $$\frac{Tr(Z^T L_y Z)}{\sqrt{Tr(y^T L_y y) Tr(Z^T L_z Z)}}$$

is distance correlation between (a) labels y and (b) activation outputs Z.

In Equation 2, the term $$\frac{Tr(Z^T L_x Z)}{\sqrt{Tr(X^T L_x X) Tr(Z^T L_z Z)}}$$

is distance correlation between (a) raw data X and (b) activation outputs Z.

Maximizing the objective function set forth in Equation 2 may tend: (a) to maximize distance correlation between labels and activation outputs; and (b) to minimize distance correlation between raw data and activation outputs.

In some cases, the iterative updates that are performed to optimize the objective function in Equation 2: (a) do not involve receiving backpropagation gradients from an external server during training, and (b) do not involve sending activation outputs to an external server during training. Thus, the iterative updates may be performed before sharing information about raw data with other computers in a distributed deep learning network.

In a first version of universal decorrelation, a neural network (NN) onboard a client network is trained to maximize the objective function in Equation 2, and then activation outputs of a final layer of this client NN are sent to a server to initialize a NN onboard the server. In this first version of universal decorrelation, once the activations learned by the client NN are sent to the server, the client is no longer involved in training. Thus, this first version of universal decorrelation may greatly reduce communications between client and server.

In a second version of universal decorrelation, a neural network (NN) onboard a client is trained to maximize the objective function in Equation 2, and then weights and biases learned during this training are used to initialize client layers (onboard the same client) of a no-peek or split learning DNN. In this second version of universal decorrelation, after this initialization: (a) the universal decorrelator is no longer involved; and (b) training of the DNN proceeds by forward propagation and backpropagation through client layers and server layers of the DNN, as usual.

In a third version of universal decorrelation, weights and biases learned while maximizing the objective function in Equation 2 are used for transfer learning. For instance: (a) a first client may train a NN onboard the first client to maximize the objective function in Equation 2; and (b) weights and biases learned during this training may be transferred to a second client to initialize a NN onboard the second client. For example, the transferred weights and biases may initialize client layers (onboard the second client) of a split learning or no-peek DNN. In some cases, the transferred weights and balances are pre-installed in, or downloaded to, the second client. The transferred weights and balances may be modified in subsequent training onboard the second client. Alternatively, the transferred weights and biases may be "frozen" so that they do not change in subsequent training onboard the second client. This third version of universal decorrelation may be easily scaled. For instance, the weights and biases may be transferred to multiple clients and used to initialize a NN on each of the respective clients. This scalability inspired us to use the term "universal" decorrelator.

In the first, second and third versions of universal decorrelation, the universal decorrelator may function, in effect, as a "burn-in" period in which decorrelation occurs. This burn-in period may greatly reduce leakage of information that may otherwise occur during initial epochs of training.

Figure 4:
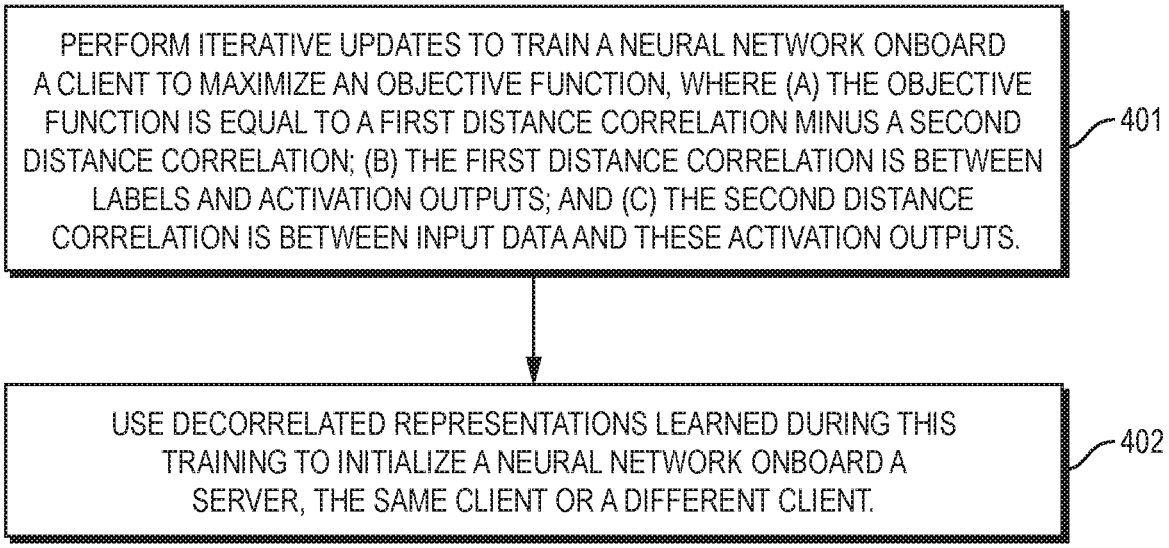
FIG. 4 illustrates a universal decorrelation method.

FIG. 4 illustrates a universal decorrelation method. The method shown in FIG. 4 includes at least the following steps: Perform iterative updates to train a neural network onboard a client to maximize an objective function, where (a) the objective function is equal to a first distance correlation minus a second distance correlation; (b) the first distance correlation is between labels and activation outputs; and (c) the second distance correlation is between input data and these activation outputs (Step 401). Use decorrelated information learned during this training to initialize a neural network onboard a server, the same client, or a different client (Step 402).

Practical Applications

This invention has many practical applications. For example, in illustrative implementations, this invention may be employed to reduce leakage of information in distributed deep learning in the fields of health care, finance, security, surveillance, and defense. More generally, this invention is well-suited for use in any context in which it is important to protect the privacy of a client's raw data (or of at least certain attributes of the raw data) during distributed deep learning.

Distance Correlation

The term "distance correlation" is used herein in the statistical sense of the term. "Distance correlation" is a different statistical measure than correlation. "Distance correlation" measures a different statistical dependency than does correlation.

Distance correlation may be described by a number of different but equivalent mathematical expressions. Furthermore, distance correlation may be estimated by a number of different algorithms. Here are some nonlimiting examples:

Python® code that defines a sample distance correlation is set forth in dCorr.txt, which is listed in the Computer Program Listing above. (To use this Python® code, the file extension ".txt" may be replaced by file extension ".py". See Software section below). This Python® code may be inserted into a program to calculate distance correlation.

The distance correlation of two random variables may be computed by dividing their distance covariance by the product of their distance standard deviations.

Distance correlation between centered data may be expressed as $$DCOR(X, Z) = \frac{Tr(X^T X Z^T Z)}{\sqrt{Tr(X^T X)^2 Tr(Z^T Z)^2}}, \qquad \text{(Equation 4)}$$

where Tr means trace (in the linear algebra sense of the term).

The squared distance correlation between random variables $x \in \mathbb{R}^d$ and $y \in \mathbb{R}^m$ with finite first moments may be expressed as $$\rho^2(x, y) = \begin{cases} \frac{v^2(x, y)}{\sqrt{v^2(x, x)v^2(y, y)}}, & v^2(x, x)v^2(y, y) > 0. \\ 0, & v^2(x, x)v^2(y, y) = 0. \end{cases} \qquad \text{(Equation 5)}$$

where $v^2(x, y)$ is distance covariance between x and y.

Note: distance covariance between random variables $x \in \mathbb{R}^d$ and $y \in \mathbb{R}^m$ with finite first moments may be expressed as a nonnegative number given by $$v^2(x,y) = \int_{R^{d+m}} |f_{x,y}(t,s) - f_x(t)f_y(s)|^2 w(t,s) dt ds \qquad \text{(Equation 6)}$$

where (1) $f_x$, $f_y$ are characteristic functions of x, y, (2) $f_{x,y}$ is the joint characteristic function, (3) w(t,s) is a weight function defined as $w(t,s) = (C(p,\alpha)C(q,\alpha)|t|_p^{\alpha+p}|s|_q^{\alpha+q})^{-1}$; (4)

$$C(d, \alpha) = \frac{2\pi^{d/2}\Gamma(1-\alpha/2)}{\alpha 2^\alpha \Gamma((\alpha+d)/2)},$$

and (5) π is Archimedes' constant.

Given i.i.d samples $X \times y = \{(x_k, y_k)|k=1, 2, 3, \ldots, n\}$ and corresponding double centered Euclidean distance matrices $\hat{E}_X$ and $\hat{E}_Y$, the squared sample distance correlation may be expressed as $$\hat{v}^2(X, Y) = \frac{1}{n^2} \sum_{k,l=1}^{n} [\hat{E}_X]_{k,l} [\hat{E}_Y]_{k,l} \qquad \text{(Equation 7)}$$

Sample distance correlation may be expressed as $$\hat{\rho}^2(X, Y) = \begin{cases} \frac{\hat{v}^2(X, Y)}{\sqrt{\hat{v}^2(X, X)\hat{v}^2(Y, Y)}}, & \hat{v}^2(X, X)\hat{v}^2(Y, Y) > 0. \\ 0, & \hat{v}^2(X, X)\hat{v}^2(Y, Y) = 0. \end{cases} \qquad \text{(Equation 8)}$$

Given matrices of squared Euclidean distances $E_X$ and $E_Y$ and Laplacians $L_X$ and $L_Y$ formed over adjacency matrices $\hat{E}_X$ and $\hat{E}_Y$, the square of sample distance correlation $\hat{\rho}^2(X, Y)$ may be expressed as $$\hat{\rho}^2(X, Y) = \frac{Tr(X^T L_Y X)}{\sqrt{Tr(Y^T L_Y Y) Tr(X^T L_X X)}}. \qquad \text{(Equation 9)}$$

In some implementations of this invention, squared distance correlation—instead of distance correlation—is used in an objective function. For instance, in the objective function in Equation 1, DCOR(X, Z) may be replaced by the squared distance correlation of X and Z.

Software

In the Computer Program Listing above, twelve computer program files are listed. These twelve computer program files comprise software employed in a prototype of this invention.

In order to submit these twelve programs to the U.S. Patent and Trademark Office, the twelve program files were converted to ASCII .txt format. In each of these twelve programs, these changes may be reversed, so that the twelve programs may be run. Specifically: (a) the ".txt" file extension may be replaced with the ".py" file extension for the AEs.txt, dCorr.txt, generate_ir.txt, image_folder.txt, main.txt, resnet.txt, ResNet50.txt programs; and (b) the ".txt" file extension may be replaced with the ".ipynb" file extension for the Analyze.txt, load_model.txt, noPeekCifar10.txt, noPeekUTKFace.txt, and noPeekUTKFace_attribute.txt programs.

This invention is not limited to the software set forth in these twelve computer program files. Other software may be employed. Depending on the particular implementation, the software used in this invention may vary.

Computers

In illustrative implementations of this invention, one or more computers (e.g., servers, network hosts, client computers, integrated circuits, microcontrollers, controllers, microprocessors, field-programmable-gate arrays, personal computers, digital computers, driver circuits, or analog computers) are programmed or specially adapted to perform one or more of the following tasks: (1) to minimize distance correlation between raw data and activation outputs; (2) to encrypt and decrypt data; (3) to optimize an objective function; (4) to train a neural network; (5) to make predictions with a trained neural network; (5) to perform any other calculation, computation, program, algorithm, or computer function described or implied herein; (6) to receive signals indicative of human input; (7) to output signals for controlling transducers for outputting information in human perceivable format; (8) to process data, to perform computations, and to execute any algorithm or software; and (9) to control the read or write of data to and from memory devices (tasks 1-9 of this sentence being referred to herein as the "Computer Tasks"). The one or more computers (e.g. 101, 102, 103, 104, 105) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory computer-readable media. For example, in some cases, these instructions comprise instructions for a computer to perform any calculation, computation, program, algorithm, or computer function described or implied herein. For instance, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more tangible, machine readable media, with instructions encoded thereon for one or more computers to perform one or more of the Computer Tasks. In some implementations, these one or more media are not transitory waves and are not transitory signals.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, one or more computers (e.g., 101, 102, 103, 104, 105) are configured for wireless or wired communication with other devices in a network.

For example, in some cases, one or more of these devices include a wireless module for wireless communication with other devices in a network. Each wireless module include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables and wiring.

In some cases, one or more computers (e.g., 101, 102, 103, 104, 105) are programmed for communication over a wired or wireless network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To say that a calculation is "according to" a first equation means that the calculation includes (a) solving the first equation; or (b) solving a second equation, where the second equation is derived from the first equation. Non-limiting examples of "solving" an equation include solving the equation in closed form or by numerical approximation or by optimization.

"Activation output" means output of an activation.

"Archimedes' constant" means the ratio of a circle's circumference to its diameter. Archimedes' constant is sometimes called "pi" or "π". Archimedes' constant is an irrational number that is approximately equal to 3.14159.

A human being is not a "client", as that term is used herein.

To compute "based on" specified data means to perform a computation that takes the specified data as an input.

The term "comprise" (and grammatical variations thereof) shall be construed as if followed by "without limitation". If A comprises B, then A includes B and may include other things.

Each of the following is a non-limiting example of a "computer", as that term is used herein: (a) a digital computer; (b) an analog computer; (c) a computer that performs both analog and digital computations; (d) a microcontroller; (e) a microprocessor; (f) a controller; (g) a tablet computer; (h) a notebook computer; (i) a laptop computer, (j) a personal computer; (k) a mainframe computer; and (1) a quantum computer. However, a human is not a "computer", as that term is used herein.

"Computer Tasks" is defined above.

"Defined Term" means a term or phrase that is set forth in quotation marks in this Definitions section.

"Distributed neural network" means a neural network that is performed on a plurality of computers, in such a way that each computer in the plurality performs some, but not all, of the layers of the network.

For an event to occur "during" a time period, it is not necessary that the event occur throughout the entire time period. For example, an event that occurs during only a portion of a given time period occurs "during" the given time period.

The term "e.g." means for example.

Each equation above may be referred to herein by the equation number set forth to the right of the equation. Non-limiting examples of an "equation", as that term is used herein, include: (a) an equation that states an equality; (b) an inequation that states an inequality; (c) a mathematical statement of proportionality or inverse proportionality; (d) a system of equations; (e) a mathematical optimization problem; or (f) a mathematical expression.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, so that they each may be referred to later with specificity (e.g., by referring to "the first" thing and "the second" thing later). For example, if a device has a first socket and a second socket, then, unless the context clearly indicates otherwise, the device may have two or more sockets, and the first socket may occur in any spatial order relative to the second socket. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

As used herein, in the context of a neural network, "intermediate layer" means an intermediate layer of the neural network.

As used herein, "invertibility" of raw data from activation outputs means vulnerability to an attack in which raw data is reconstructed based at least in part on the activation outputs.

As used herein, a "layer" of a neural network may be implemented in software or hardware.

As used herein, a single scalar is not a "matrix".

To "multiply" includes to multiply by an inverse. Thus, to "multiply" includes to divide.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

As used herein, "raw data" means data that is fed as an input into the input layer of a neural network. As used herein, "raw data" may have been processed or transformed, prior to being fed as an input into the input layer of a neural network.

A human being is not a "server", as that term is used herein.

As used herein, the term "set" does not include a group with no elements.

Unless the context clearly indicates otherwise, "some" means one or more.

As used herein, a "subset" of a set consists of less than all of the elements of the set.

The term "such as" means for example.

"Split layer activation outputs" means outputs of activations of a split layer.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) one or more steps in the method are done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Notwithstanding anything to the contrary herein or in the Gupta Patent Publication, if there is any conflict between any definition set forth in the Gupta Patent Publication and any definition set forth herein, then the definition set forth herein shall control. For purposes of this paragraph, the incorporation by reference of the Gupta Patent Publication is disregarded (i.e., treated as not occurring) when determining whether a definition or other language is set forth "herein".

Variations

This invention may be implemented in many different ways. Here are some non-limiting examples:

In some implementations, this invention is a method comprising training a distributed neural network to minimize a loss function in such a way as to tend to reduce distance correlation between raw data and activation outputs of an intermediate layer of the network. In some cases, reducing the distance correlation tends to reduce invertibility of the raw data from the activation outputs. In some cases, the loss function is a sum of a weighted distance correlation and a weighted categorical cross entropy. In some cases: (a) the loss function is the sum of a weighted distance correlation and a weighted categorical cross entropy; (b) the weighted distance correlation is the product of (i) a first scalar weight and (ii) distance correlation between the raw data and the activation outputs; and (c) the weighted categorical cross entropy is the product of (i) a second scalar weight and (ii) categorical cross entropy of predicted labels for the raw data and actual labels for the raw data. In some cases: (a) the training includes iterations of forward propagation and backpropagation; (b) in each of the iterations, forward propagation comprises forward propagation through client layers followed by forward propagation through server layers, the client layers being layers of the neural network that are performed by a client computer and the server layers being layers of the neural network that are performed by a server computer; and (c) in each of the iterations, backpropagation comprises backpropagation through server layers followed by backpropagation through client layers. In some cases: (a) the training includes iterations of forward propagation and backpropagation; (b) in each of the iterations, forward propagation comprises forward propagation through client layers followed by forward propagation through server layers, the client layers being layers of the neural network that are performed by a client computer and the server layers being layers of the neural network that are performed by a server computer; (c) in each of the iterations, backpropagation comprises backpropagation through server layers followed by backpropagation through client layers; and (d) the intermediate layer is the last client layer updated during each forward propagation. In some cases, the loss function is $\alpha_1 DCOR(X,Z)+\alpha_2 CCE(Y_{true}, Y)$, where DCOR is distance correlation, CCE is categorical cross entropy, X is the raw data, Z is activation outputs of the intermediate layer, $Y_{true}$ is true labels for the raw data, Y is predicted labels for the raw data, $\alpha_1$ and $\alpha_2$ are scalar weights, and n is the number of samples of the raw data. Each of the cases described above in this paragraph is an example of the method described in the first sentence of this paragraph, and is also an example of an embodiment of this invention that may be combined with other embodiments of this invention.

In some implementations, this invention is a method comprising training a distributed neural network to minimize a loss function in such a way as to tend to reduce distance correlation between (a) one or more specific features of raw data and (b) activation outputs of an intermediate layer of the network. In some cases, reducing the distance correlation tends to reduce invertibility of the one or more specific features of raw data from the activation outputs. In some cases, the training is on all of the raw data. In some cases, the loss function is a sum of a weighted distance correlation and a weighted categorical cross entropy. In some cases: (a) the loss function is the sum of a weighted distance correlation and a weighted categorical cross entropy; (b) the weighted distance correlation is the product of (i) a first scalar weight and (ii) distance correlation between the activation outputs and the one or more specific features of the raw data; and (c) the weighted categorical cross entropy is the product of (i) a second scalar weight and (ii) categorical cross entropy of predicted labels for the raw data and actual labels for the raw data. In some cases: (a) the training includes iterations of forward propagation and backpropagation; (b) in each of the iterations, forward propagation comprises forward propagation through client layers followed by forward propagation through server layers, the client layers being layers of the neural network that are performed by a client computer and the server layers being layers of the neural network that are performed by a server computer; and (c) in each of the iterations, backpropagation comprises backpropagation through server layers followed by backpropagation through client layers. In some cases: (a) the training includes iterations of forward propagation and backpropagation; (b) in each of the iterations, forward propagation comprises forward propagation through client layers followed by forward propagation through server layers, the client layers being layers of the neural network that are performed by a client computer and the server layers being layers of the neural network that are performed by a server computer; (c) in each of the iterations, backpropagation comprises backpropagation through server layers followed by backpropagation through client layers; and (d) the intermediate layer is the last client layer updated during each forward propagation. In some cases, the loss function is $\alpha_1 DCOR(X,Z)+\alpha_2 CCE(Y_{true}, Y)$, where DCOR is distance correlation, CCE is categorical cross entropy, X is one or more features but not all features of the raw data, Z is activation outputs of the intermediate layer, $Y_{true}$ is true labels for the raw data, Y is predicted labels for the raw data, $\alpha_1$ and $\alpha_2$ are scalar weights, and n is the number of samples of the raw data. Each of the cases described above in this paragraph is an example of the method described in the first sentence of this paragraph, and is also an example of an embodiment of this invention that may be combined with other embodiments of this invention.

In some implementations, this invention is a method comprising training a first neural network to maximize an objective function in such a way as to tend to reduce distance correlation between raw data and activation outputs of a layer of the first neural network, wherein: (a) the objective function is equal to a first term minus a second term; (b) the first term is equal to distance correlation between (i) the activation outputs and (ii) and labels for the raw data; (c) the second term is equal to distance correlation between (i) the activation outputs and (ii) the raw data; and (d) the training of the first neural network is performed on a client computer. In some cases: (a) the method further comprises (i) after the training of the first neural network, sending the activation outputs of the layer from the client computer to a server computer; (ii) initializing, with the activation outputs, a second neural network on the server computer, and (ii) training the second neural network on the server network; and (b) the first computer does not participate in the training of the second neural network, except for the sending before the initializing. In some cases: (a) the method further comprises sending, after the training, the activation outputs from the client computer to a server computer to initialize a second neural network on the server computer; and (b) before the training is completed, the client computer sends to the server computer neither the raw data nor information derived from the raw data. In some cases, the method further comprises initializing, with weights and biases learned during the training, weights and biases of layers that are in a distributed neural network and are calculated by the client computer. In some cases, the objective function is $$\frac{Tr(Z^T L_y Z)}{\sqrt{Tr(y^T L_y y)Tr(Z^T L_z Z)}} - \frac{Tr(Z^T L_x Z)}{\sqrt{Tr(X^T L_x X)Tr(Z^T L_z Z)}},$$

where (1) Tr means trace (in the linear algebra sense of the term); (2) $L_x$ and $L_y$ are Laplacian matrices formed over adjacency matrices $\hat{E}_x$ and $\hat{E}_y$, respectively; (3) $E_x$ and $E_y$ are matrices of squared Euclidian distances; (4) X is a matrix of the raw data; (5) y is a matrix of labels for the raw data; and (6) Z is a matrix of activation outputs of a layer of a neural network. Each of the cases described above in this paragraph is an example of the method described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

Any document that is incorporated by reference herein ("incorporated document") does not limit the scope of this invention (including the scope of any hardware, hardware component, method, process, step, software, algorithm, feature, or technology that is described in the main part of this document). Any incorporated document shall only expand—and shall not limit—the scope of this invention. For example, if any given feature described in any incorporated document is different from, or in addition to, the features described in the main part of this document, this additional or different feature of the incorporated document does not limit any implementation of this invention described in the main part of this document. As used herein, the "main part of this document" means this entire document (including any drawings listed in the Brief Description of Drawings above), except that the "main part of this document" does not include any document that is incorporated by reference herein.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed:

1. A method comprising training a distributed neural network to minimize a loss function in such a way as to reduce a distance correlation between raw data and activation outputs of an intermediate layer of the distributed neural network, wherein:
   (a) the training includes iterations of forward propagation and backpropagation;
   (b) in each of the iterations, forward propagation comprises forward propagation through client layers followed by forward propagation through server layers, the client layers being layers of the neural network that are performed by a client computer and the server layers being layers of the neural network that are performed by a server computer; and
   (c) in each of the iterations, backpropagation comprises backpropagation through server layers followed by backpropagation through client layers.

2. The method of claim 1, wherein reducing the distance correlation reduces invertibility of the raw data from the activation outputs.

3. The method of claim 1, wherein the loss function is a sum of a weighted distance correlation and a weighted categorical cross entropy.

4. The method of claim 1, wherein:
   (d) the loss function is a sum of a weighted distance correlation and a weighted categorical cross entropy;
   (e) the weighted distance correlation is a product of (i) a first scalar weight and (ii) the distance correlation between the raw data and the activation outputs; and
   (f) the weighted categorical cross entropy is a product of (i) a second scalar weight and (ii) a categorical cross entropy of predicted labels for the raw data and actual labels for the raw data.

5. The method of claim 1, wherein:
   the intermediate layer is a last client layer updated during each forward propagation.

6. The method of claim 1, wherein the loss function is $\alpha_1 DCOR(X,Z) + \alpha_2 CCE(Y_{true}, Y)$, where DCOR is distance correlation, CCE is categorical cross entropy, X is the raw data, Z is activation outputs of the intermediate layer, $Y_{true}$ is true labels for the raw data, Y is predicted labels for the raw data, $\alpha_1$ and $\alpha_2$ are scalar weights, and n is the number of samples of the raw data.

7. A method comprising training a distributed neural network to minimize a loss function in such a way as to reduce a distance correlation between (a) one or more specific features of raw data and (b) activation outputs of an intermediate layer of the network, wherein:
   (a) the training includes iterations of forward propagation and backpropagation;
   (b) in each of the iterations, forward propagation comprises forward propagation through client layers followed by forward propagation through server layers, the client layers being layers of the neural network that are performed by a client computer and the server layers being layers of the neural network that are performed by a server computer; and
   (c) in each of the iterations, backpropagation comprises backpropagation through server layers followed by backpropagation through client layers.

8. The method of claim 7, wherein reducing the distance correlation reduces invertibility of the one or more specific features of raw data from the activation outputs.

9. The method of claim 7, wherein the training is on all of the raw data.

10. The method of claim 7, wherein the loss function is a sum of a weighted distance correlation and a weighted categorical cross entropy.

11. The method of claim 7, wherein:
   (d) the loss function is the sum of a weighted distance correlation and a weighted categorical cross entropy;
   (e) the weighted distance correlation is a product of (i) a first scalar weight and (ii) the distance correlation between the activation outputs and the one or more specific features of the raw data; and
   (c) the weighted categorical cross entropy is a product of (i) a second scalar weight and (ii) categorical cross entropy of predicted labels for the raw data and actual labels for the raw data.

12. The method of claim 7, wherein:
   the intermediate layer is the last client layer updated during each forward propagation.

13. The method of claim 7, wherein the loss function is $\alpha_1 DCOR(X,Z) + \alpha_2 CCE(Y_{true}, Y)$, where DCOR is distance correlation, CCE is categorical cross entropy, X is one or more features but not all features of the raw data, Z is activation outputs of the intermediate layer, $Y_{true}$ is true labels for the raw data, Y is predicted labels for the raw data, $\alpha_1$ and $\alpha_2$ are scalar weights, and n is the number of samples of the raw data.

14. A method comprising training a first neural network to maximize an objective function in such a way as to reduce a distance correlation between raw data and activation outputs of a layer of the first neural network, wherein:
- (a) the objective function is equal to a first term minus a second term;
- (b) the first term is equal to distance correlation between (i) the activation outputs and (ii) and labels for the raw data;
- (c) the second term is equal to distance correlation between (i) the activation outputs and (ii) the raw data;
- (d) the training of the first neural network is performed on a client computer;
- (e) the method further comprises:
    - (i) after the training of the first neural network, sending the activation outputs of the layer from the client computer to a server computer;
    - (ii) initializing, with the activation outputs, a second neural network on the server computer, and
    - (iii) training the second neural network on the server network; and
- (f) the first computer does not participate in the training of the second neural network, except for the sending before the initializing.

15. The method of claim 14, wherein:
- (g) the method further comprises sending, after the training, the activation outputs from the client computer to a server computer to initialize a second neural network on the server computer; and
- (h) before the training is completed, the client computer sends to the server computer neither the raw data nor information derived from the raw data.

16. The method of claim 14, wherein the method further comprises initializing, with weights and biases learned during the training, weights and biases of layers that are in a distributed neural network and are calculated by the client computer.

17. The method of claim 14, wherein the objective function is $$\frac{Tr(Z^T L_y Z)}{\sqrt{Tr(y^T L_y y)Tr(Z^T L_z Z)}} - \frac{Tr(Z^T L_x Z)}{\sqrt{Tr(X^T L_x X)Tr(Z^T L_z Z)}},$$

where (1) Tr means trace (in the linear algebra sense of the term); (2) $L_x$ and $L_y$ are Laplacian matrices formed over adjacency matrices $E_x$ and $E_y$, respectively; (3) $E_x$ and $E_y$ are matrices of squared Euclidian distances; (4) X is a matrix of the raw data; (5) y is a matrix of labels for the raw data; and (6) Z is a matrix of activation outputs of a layer of a neural network.

\* \* \* \* \*